(12) United States Patent
Zhou et al.

(10) Patent No.: US 11,816,632 B2
(45) Date of Patent: Nov. 14, 2023

(54) GOODS PICKUP METHOD AND DEVICE

(71) Applicant: BEIJING JINDONG ZHENSHI INFORMATION TECHNOLOGY CO., LTD., Beijing (CN)

(72) Inventors: Jixin Zhou, Beijing (CN); Wei Li, Beijing (CN); Hengbin Zhu, Beijing (CN); Zhikang Liang, Beijing (CN)

(73) Assignee: BEIJING JINDONG ZHENSHI INFORMATION TECHNOLOGY CO., LTD., Beijing (CN)

(*) Notice: Subject to any disclaimer, the term of this patent is extended or adjusted under 35 U.S.C. 154(b) by 272 days.

(21) Appl. No.: 17/425,236

(22) PCT Filed: Dec. 27, 2019

(86) PCT No.: PCT/CN2019/129232
§ 371 (c)(1),
(2) Date: Jul. 22, 2021

(87) PCT Pub. No.: WO2020/164319
PCT Pub. Date: Aug. 20, 2020

(65) Prior Publication Data
US 2022/0092524 A1    Mar. 24, 2022

(30) Foreign Application Priority Data

Feb. 12, 2019    (CN) .......................... 201910111158.9

(51) Int. Cl.
*G06Q 10/087*    (2023.01)
*G06Q 10/0631*    (2023.01)
(52) U.S. Cl.
CPC ..... *G06Q 10/087* (2013.01); *G06Q 10/06316* (2013.01)

(58) Field of Classification Search
CPC .......... G06Q 10/087; G06Q 10/06316; G06Q 10/06; G06Q 10/08; G06Q 10/063114; G06Q 10/0631; G06Q 10/083
See application file for complete search history.

(56) References Cited

U.S. PATENT DOCUMENTS

2017/0078221 A1* 3/2017 Ding .................. G06Q 30/0202
2018/0127211 A1* 5/2018 Jarvis .................. G05D 1/0297
(Continued)

FOREIGN PATENT DOCUMENTS

CN    107235276 A    10/2017
CN    107583882 A *  1/2018
(Continued)

OTHER PUBLICATIONS

Translation of International Search Report for Application No. PCT/CN2019/129232 dated Apr. 2, 2020 (2 pages).

*Primary Examiner* — Michael Jared Walker
(74) *Attorney, Agent, or Firm* — Michael Best & Friedrich LLP

(57) ABSTRACT

A goods-picking method and device relate to the field of computer technology. The method comprises: acquiring order information to construct a goods-picking task (S101); associating one or more goods-picking tasks with the same transport vehicle according to an overlapping degree of passages where goods-picking storage sites between the goods-picking tasks are located (S102); acquiring all goods-picking storage sites of the goods-picking tasks of the transport vehicle, and then calculating a path for the transport vehicle (S103), wherein the path comprises at least one goods-picking parking spot, each of which corresponds to at least one goods-picking storage site; and receiving location information of available goods-picking persons and a goods-picking parking spot where the transport vehicle is currently located, calculating an available goods-picking person (Continued)

matching the transport vehicle, and sending a goods-picking task associated with the transport vehicle to the available goods-picking person for execution (S104). The method can solve the problem of low goods-picking work efficiency in the prior art.

9 Claims, 5 Drawing Sheets

(56) References Cited

U.S. PATENT DOCUMENTS

| | | | |
|---|---|---|---|
| 2018/0127212 A1* | 5/2018 | Jarvis | B60P 1/00 |
| 2018/0158020 A1* | 6/2018 | Khasis | G01C 21/343 |
| 2018/0197137 A1* | 7/2018 | High | B64C 39/024 |
| 2018/0229950 A1* | 8/2018 | Tyber | B65G 63/002 |
| 2019/0066033 A1* | 2/2019 | Mains, Jr. | G06Q 10/083 |

FOREIGN PATENT DOCUMENTS

| | | | | |
|---|---|---|---|---|
| CN | 108100548 A | | 6/2018 | |
| CN | 108861276 A | * | 11/2018 | B65G 1/0492 |
| CN | 108861276 A | | 11/2018 | |
| CN | 108921327 A | | 11/2018 | |

\* cited by examiner

GOODS PICKUP METHOD AND DEVICE

CROSS-REFERENCE TO RELATED APPLICATION(S)

This is a U.S. national stage entry of International Patent Application No. PCT/CN2019/129232, filed on Dec. 27, 2019, which claims priority to Chinese Patent Application No. 201910111158.9, filed on Feb. 12, 2019, the entire contents of each of which are fully incorporated herein by reference.

TECHNICAL FIELD

The present invention relates to the field of computer technology, in particular to a goods-picking method and device.

BACKGROUND ART

In the process of fulfilling orders in the warehouse, multiple orders are combined together to form a goods-picking task list, which is then distributed to a goods-picking person to perform a goods-picking task. At present, the traditional modes for performing goods-picking tasks can be divided into two categories:

The first category: One goods-picking person completes all goods-picking, that is, one person independently completes the goods-picking tasks he/she receives, and the goods-picking path is a sequence of main passages where storage sites of the goods-picking tasks are located.

The second category: Multiple goods-picking persons complete a goods-picking task in relay, that is, each goods-picking person is responsible for a part of an area, so that each goods-picking person can perform goods-picking tasks in his/her own area, and, after the goods-picking persons in the front have completed the goods-picking tasks in their own areas, other goods-picking tasks can be passed to the goods-picking persons at the back via a conveyor line.

In the process of implementing the present invention, the inventor has found that the prior art has at least the following problems:

At the time of performing a goods-picking task according to the goods-picking task list, one goods-picking person completely completes the entire goods-picking task by manpower, or multiple goods-picking persons complete the goods-picking task in relay via a conveyor line. However, the mode, in which one goods-picking person independently completes all goods-picking tasks would make an invalid walking distance of the person too long; picking goods in relay reduces the invalid walking distance to a certain extent, but the deployment of the conveyor line in the warehouse is inconvenient and inflexible.

SUMMARY OF THE INVENTION

In view of this, embodiments of the present invention provide a goods-picking method and device, which can solve the problem of low goods-picking work efficiency in the prior art.

In order to accomplish the above object, according to one aspect of the embodiments of the present invention, a goods-picking method is provided, comprising: acquiring order information to construct a goods-picking task; associating one or more goods-picking tasks with the same transport vehicle according to an overlapping degree of passages where goods-picking storage sites between the goods-picking tasks are located; acquiring all goods-picking storage sites of the goods-picking tasks of the transport vehicle, and then calculating a path for the transport vehicle, wherein the path comprises at least one goods-picking parking spot, each of which corresponds to at least one goods-picking storage site; and receiving location information of available goods-picking persons and a goods-picking parking spot where the transport vehicle is currently located, calculating an available goods-picking person matching the transport vehicle, and sending a goods-picking task associated with the transport vehicle to the available goods-picking person for execution.

Optionally, acquiring order information to construct a goods-picking task comprises:

extracting the latest out-of-warehouse time in the order information, and judging whether a distance between the latest out-of-warehouse time of orders and the current time is greater than a preset time difference threshold; and according to judgment results, if the distance is greater than the preset time difference threshold, pre-grouping orders with a distance between the latest out-of-warehouse time and the current time being greater than the preset time difference threshold according to a business type, then grouping the orders according to the overlapping degree, and saving ungrouped orders for subsequent grouping; if the distance is less than or equal to the preset time difference threshold, pre-grouping orders with a distance between the latest out-of-warehouse time and the current time being less than or equal to the preset time difference threshold according to a business type, then grouping the orders according to the overlapping degree, and then dividing ungrouped orders into one group.

Optionally, after receiving location information of available goods-picking persons, there are comprised:

judging whether there is a transport vehicle with a goods-picking task approaching an out-of-warehouse time limit, and if so, sending goods-picking task line information approaching the out-of-warehouse time limit and goods-picking task line information that matches a storage site of the goods-picking task approaching the out-of-warehouse time limit for execution; and if not, calculating an available goods-picking person closest to the location of the transport vehicle, and sending the goods-picking task line information associated with the transport vehicle and matching the goods-picking storage site to the available goods-picking person for execution.

Optionally, calculating a transport vehicle matching the available goods-picking persons comprises:

calculating an available goods-picking person closest to the location of the transport vehicle according to the goods-picking parking spot where the transport vehicle is currently located and the location information of the available goods-picking person.

Optionally, after sending a goods-picking task associated with the transport vehicle to the available goods-picking person for execution, there are comprised:

determining execution and completion of the goods-picking task associated with the transport vehicle, and judging whether the transport vehicle has next goods-picking parking spot according to its path; and if so, controlling the transport vehicle to drive to the next goods-picking parking spot; if not, controlling the transport vehicle to drive to a destination location.

Besides, according to one aspect of the embodiments of the present invention, a goods-picking device is provided, comprising: a construction module for acquiring order information to construct a goods-picking task; an association module for associating one or more goods-picking tasks with the same transport vehicle according to an overlapping degree of passages where goods-picking storage sites between the goods-picking tasks are located; and a goods-picking module for acquiring all goods-picking storage sites of the goods-picking tasks of the transport vehicle, and then calculating a path for the transport vehicle, wherein the path comprises at least one goods-picking parking spot, each of which corresponds to at least one goods-picking storage site; and receiving location information of available goods-picking persons and a goods-picking parking spot where the transport vehicle is currently located, calculating an available goods-picking person matching the transport vehicle, and sending a goods-picking task associated with the transport vehicle to the available goods-picking person for execution.

Optionally, the construction module acquires order information to construct a goods-picking task, including:

extracting the latest out-of-warehouse time in the order information, and judging whether a distance between the latest out-of-warehouse time of orders and the current time is greater than a preset time difference threshold; and according to judgment results, if the distance is greater than the preset time difference threshold, pre-grouping orders with a distance between the latest out-of-warehouse time and the current time being greater than the preset time difference threshold according to a business type, then grouping the orders according to the overlapping degree, and saving ungrouped orders for subsequent grouping; if the distance is less than or equal to the preset time difference threshold, pre-grouping orders with a distance between the latest out-of-warehouse time and the current time being less than or equal to the preset time difference threshold according to a business type, then grouping the orders according to the overlapping degree, and then dividing ungrouped orders into one group.

Optionally, after the goods-picking module receives location information of available goods-picking persons, there are comprised:

judging whether there is a transport vehicle with a goods-picking task approaching an out-of-warehouse time limit, and if so, sending goods-picking task line information approaching the out-of-warehouse time limit and goods-picking task line information that matches a storage site of the goods-picking task approaching the out-of-warehouse time limit for execution; and if not, calculating an available goods-picking person closest to the location of the transport vehicle, and sending the goods-picking task line information associated with the transport vehicle and matching the goods-picking storage site to the available goods-picking person for execution.

Optionally, the goods-picking module calculates a transport vehicle matching the available goods-picking persons, including:

calculating an available goods-picking person closest to the location of the transport vehicle according to the goods-picking parking spot where the transport vehicle is currently located and the location information of the available goods-picking person.

Optionally, after the goods-picking module sends a goods-picking task associated with the transport vehicle to the available goods-picking person for execution, there are comprised:

determining execution and completion of the goods-picking task associated with the transport vehicle, and judging whether the transport vehicle has next goods-picking parking spot according to its path; and if so, controlling the transport vehicle to drive to the next goods-picking parking spot; if not, controlling the transport vehicle to drive to a destination location.

According to another aspect of the embodiments of the present invention, an electronic device is further provided, comprising:

one or more processors; and a storage device for storing one or more programs, wherein when executed by the one or more processors, the one or more programs cause the one or more processors to implement a method according to any one of the above goods-picking embodiments.

According to another aspect of the embodiments of the present invention, there is further provided a computer-readable medium on which a computer program is stored, the program, when executed by a processor, implementing a method according to any one of the above goods-picking embodiments.

An embodiment of the above invention has the following advantages or beneficial effects:

The present invention acquires order information to construct a goods-picking task; associates one or more goods-picking tasks with the same transport vehicle according to an overlapping degree of passages where goods-picking storage sites between the goods-picking tasks are located; acquires all goods-picking storage sites of the goods-picking tasks of the transport vehicle, and then calculates a path for the transport vehicle; and receives location information of available goods-picking persons and a goods-picking parking spot where the transport vehicle is currently located, calculates an available goods-picking person matching the transport vehicle, and sends a goods-picking task associated with the transport vehicle to the available goods-picking person for execution. Therefore, the present invention scientifically plans a path for a transport vehicle by introducing a combination of the transport vehicle supporting goods-picking containers and goods-picking persons to reduce invalid walking distances of the goods-picking persons so as to improve the goods-pick work efficiency.

The further effects of the above-mentioned non-conventional optional modes will be described below in conjunction with specific embodiments.

BRIEF DESCRIPTION OF THE DRAWINGS

The figures are used for a better understanding of the present invention, and do not constitute improper limitations to the present invention, wherein.

DETAILED DESCRIPTION OF THE EMBODIMENTS

Hereinafter, the exemplary embodiments of the present invention are described with reference to the figures, wherein various details of the embodiments of the present invention are included to facilitate the understanding, and the embodiments of the present invention should be considered as only exemplary ones. Therefore, those skilled in the art should recognize that various changes and modifications may be made to the embodiments described herein without departing from the scope and spirit of the present invention. Also, descriptions of well-known functions and structures are omitted in the following description for clarity and conciseness.

Figure 1:
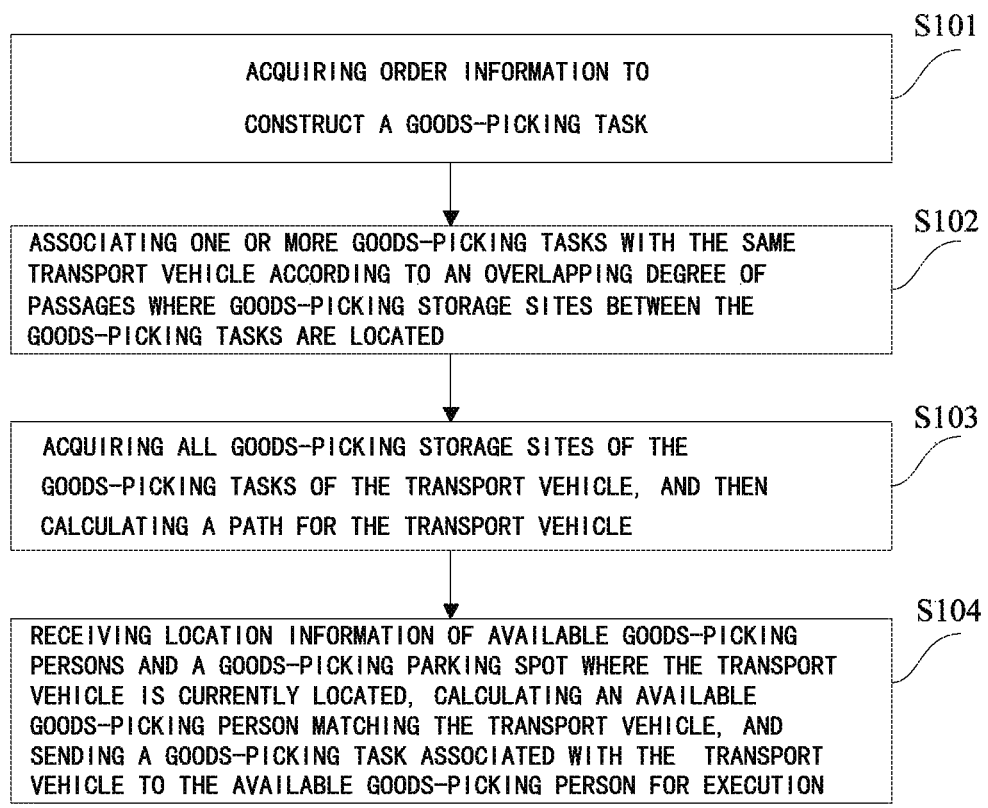
FIG. 1 is a schematic diagram of a main flow of a goods-picking method according to a first embodiment of the present invention.

FIG. 1 is a schematic diagram of a main flow of a goods-picking method according to a first embodiment of the present invention, and the goods-picking method may comprise:

Step S101: acquiring order information to construct a goods-picking task.

In a further embodiment, at the time of constructing a goods-picking task, the latest out-of-warehouse time can be extracted from the order information to judge whether a distance between the latest out-of-warehouse time of orders and the current time is greater than a preset time difference threshold. Then, according to judgment results, if the distance is greater than the preset time difference threshold, orders with a distance between the latest out-of-warehouse time and the current time being greater than the preset time difference threshold are pre-grouped according to a business type, the orders are then grouped according to the overlapping degree, and ungrouped orders are saved for subsequent grouping.

If the distance is less than or equal to the preset time difference threshold, orders with a distance between the latest out-of-warehouse time and the current time being less than or equal to the preset time difference threshold are pre-grouped according to a business type, the orders are then grouped according to the overlapping degree, and ungrouped orders are then divided into one group.

Step S102: associating one or more goods-picking tasks with the same transport vehicle according to an overlapping degree of passages where goods-picking storage sites between the goods-picking tasks are located.

Preferably, an AGV trolley may be used as the transport vehicle. The AGV trolley, which may be an autonomous vehicle that assists in goods-picking, can enter passages and stay in front of storage sites, and can walk independently according to a path of its own goods-picking task.

Step S103: acquiring all goods-picking storage sites of the goods-picking tasks of the transport vehicle, and then calculating a path for the transport vehicle.

Preferably, after calculating a path for the transport vehicle, the transport vehicle can arrive at a corresponding goods-picking parking spot according to the path, wherein the path comprises at least one goods-picking parking spot, each of which corresponds to at least one goods-picking storage site. Thus, at the time of calculating an available goods-picking person matching the transport vehicle, step S104 can calculate an available goods-picking person matching the transport vehicle at the goods-picking parking spot.

In the embodiment, the destination location of the transport vehicle refers to a destination after the completion of goods-picking in the warehouse. Warehouse destinations to be reached after the goods-picking is completed, according to different business types, may be different or the same, and warehouse destinations to be reached by orders that can be associated with one transport vehicle, after the goods-picking is completed, are the same. For example, orders of an internal-distribution business type and orders of a return business type can be pre-grouped together. That is, all the orders, after being completed, finally arrive at the same place in the warehouse for subsequent processing. Herein, the internal-distribution orders refer to goods relocation orders, and the return orders refer to orders for returning goods to suppliers.

Step S104: receiving location information of available goods-picking persons and a goods-picking parking spot where the transport vehicle is currently located, calculating an available goods-picking person matching the transport vehicle, and sending a goods-picking task associated with the transport vehicle to the available goods-picking person for execution.

As a further embodiment, after receiving location information of available goods-picking persons, step S104 can first judge whether there is a transport vehicle with a goods-picking task approaching an out-of-warehouse time limit, and if so, sends goods-picking task line information approaching the out-of-warehouse time limit and goods-picking task line information that matches a storage site of the goods-picking task approaching the out-of-warehouse time limit for execution. Certainly, if not, step S104 calculates an available goods-picking person closest to the location of the transport vehicle, and sends the goods-picking task line information associated with the transport vehicle and matching the goods-picking storage site for execution.

Note that, after execution and completion of the goods-picking task associated with the transport vehicle and matching the goods-picking storage site, it can be judged whether the transport vehicle has next goods-picking parking spot according to its path. According to judgment results, if so, the transport vehicle is controlled to drive to the next goods-picking parking spot; if not, the transport vehicle is controlled to drive to a destination location.

According to the various embodiments described above, the present invention combines the transport vehicle and the goods-picking person to complete the goods-picking task. Owing to such a combination, the transport vehicle goes deep to the goods-picking storage site in the goods-picking passage, and, after merely completing the goods-picking task near the goods-picking parking spot, the goods-picking person can allow the transport vehicle to leave to the next picking parking spot, without having to follow it. Therefore, the goods-picking person can continue to pick goods nearby to another transport vehicle, so that he/she may have more time for picking goods, resulting in higher goods-picking efficiency.

Figure 2:
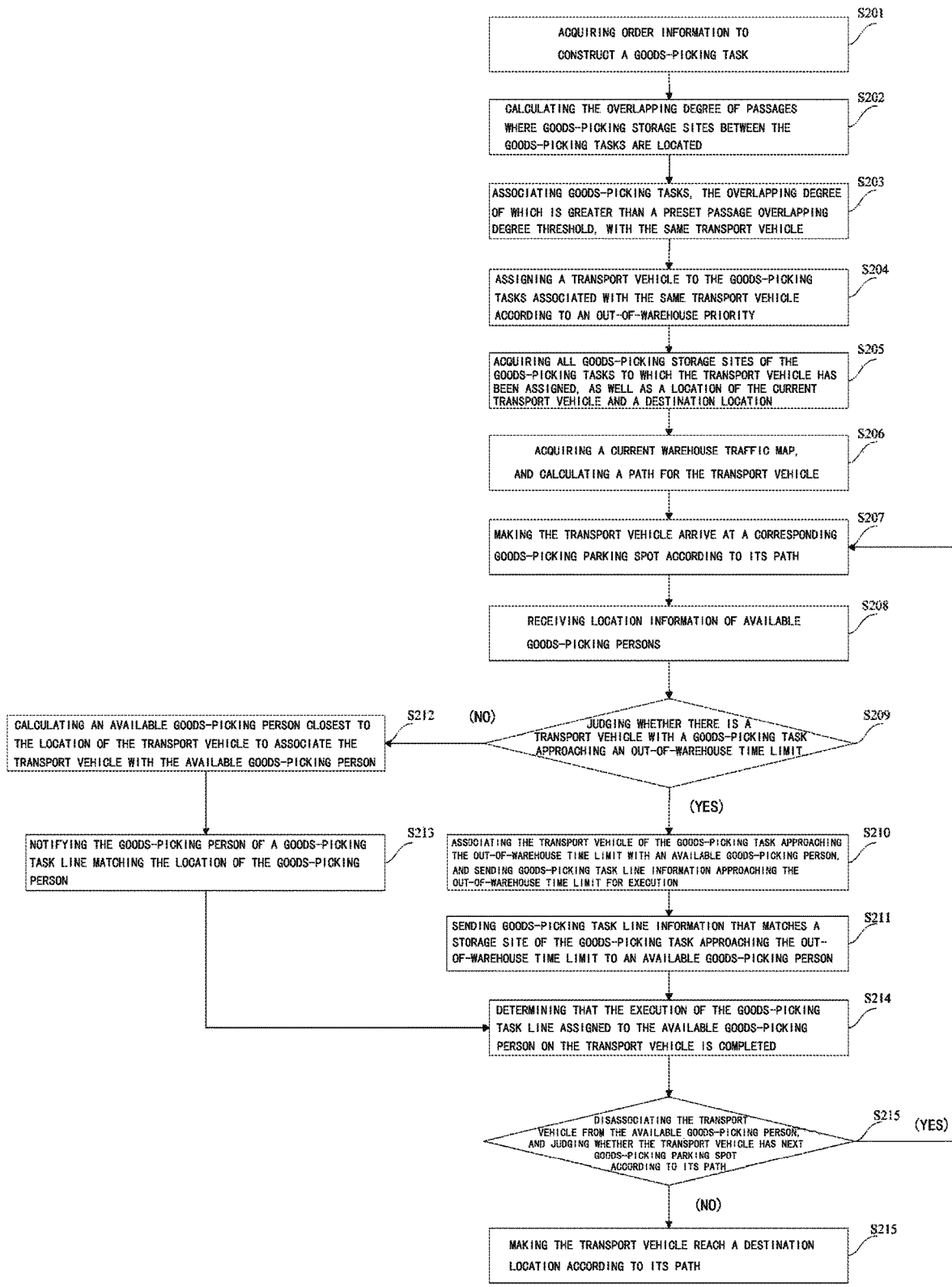
FIG. 2 is a schematic diagram of a main flow of a goods-picking method according to a reference embodiment of the present invention.
Figure 3:
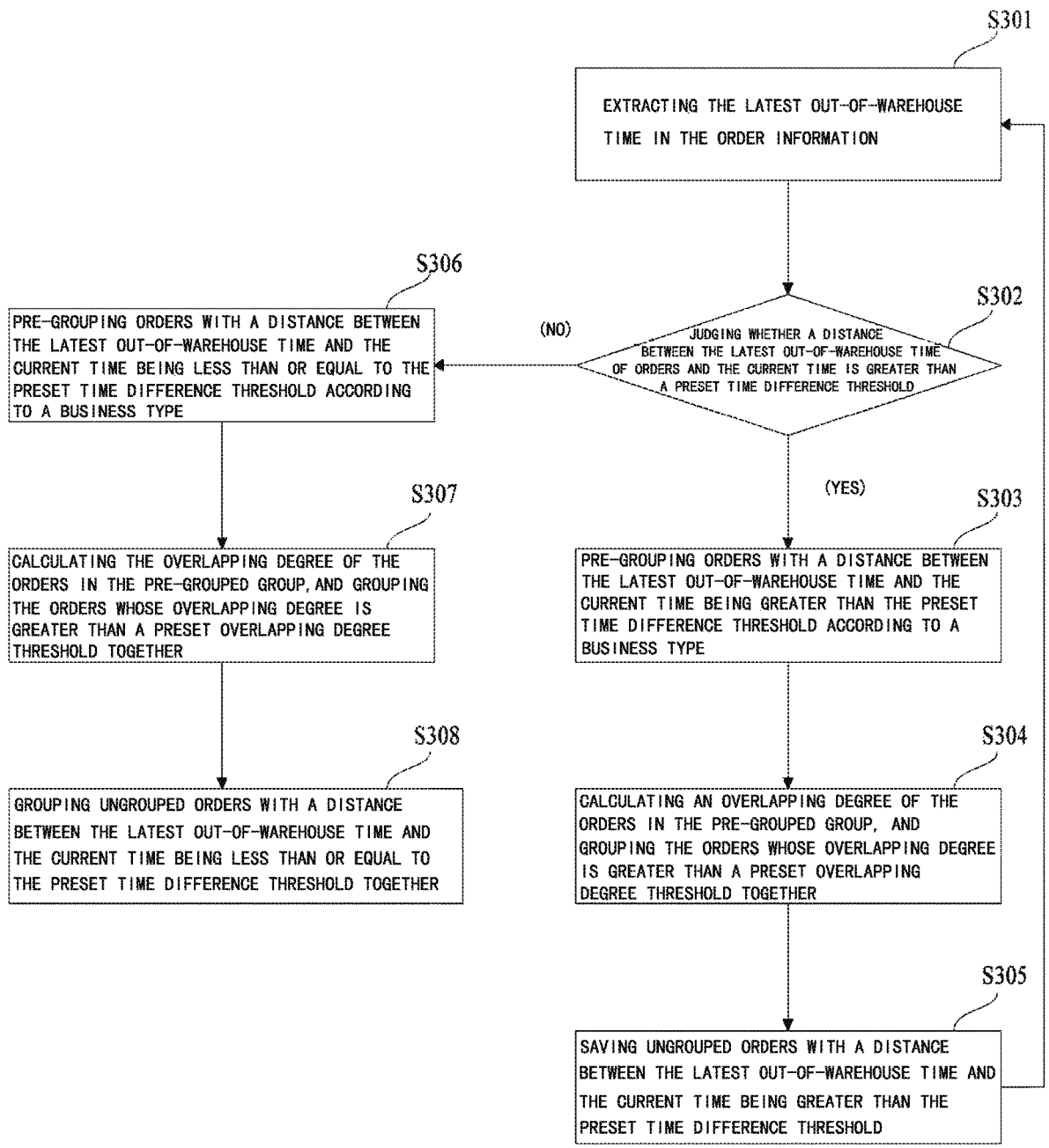
FIG. 3 is a schematic diagram of a main flow of constructing a goods-picking task according to an embodiment of the present invention.

FIG. 2 is a schematic diagram of a main flow of a goods-picking method according to a reference embodiment of the present invention, and the goods-picking method may comprise:

Step S201: acquiring order information to construct a goods-picking task.

In the embodiment, the goods-picking task is formed by combining orders together according to order attributes so as to improve the goods-picking efficiency. Each order corresponds to a goods-picking task line, and n goods-picking task lines form a goods-picking task. Each goods-picking task line may include information such as the storage site number, the product number and the quantity. Preferably, the specific implementation process may comprise:

Step S301: extracting the latest out-of-warehouse time in the order information.

Step S302: judging whether a distance between the latest out-of-warehouse time of orders and the current time is greater than a preset time difference threshold, and if so, proceeding to step S303, otherwise proceeding to step S306.

In the embodiment, if the distance between the latest out-of-warehouse time of orders and the current time is greater than the preset time difference threshold, it means that the orders may not be out of the warehouse in a hurry; if the distance between the latest out-of-warehouse time of orders and the current time is less than or equal to the preset time difference threshold, it means that the orders may be out of the warehouse in a hurry.

Step S303: pre-grouping orders with a distance between the latest out-of-warehouse time and the current time being greater than the preset time difference threshold according to a business type.

In the embodiment, orders of different business types can be pre-grouped together, mainly by virtue of their destinations being the same after the completion of goods-picking in the warehouse. That is, although the business types are different, the warehouse destinations to be reached after the completion of goods-picking are the same. For example, orders of an internal-distribution business type and orders of a return business type can be pre-grouped together. That is, all the orders, after being completed, finally arrive at the same place in the warehouse for subsequent processing. Herein, the internal-distribution orders refer to goods relocation orders, and the return orders refer to orders for returning goods to suppliers.

Step S304: calculating an overlapping degree of the orders in the pre-grouped group, and grouping the orders whose overlapping degree is greater than a preset overlapping degree threshold together.

Preferably, orders may include one commodity or multiple commodities. If the orders include only one commodity, the overlapping degree can be calculated based on commodity attribute values. Preferably, the overlapping degree of commodity storage sites can be calculated. If the orders include multiple commodities, it can be calculated based on the overlapping degree of order lines between the orders. Preferably, the overlapping degree of commodity category attributes in order lines between the orders can be calculated. Herein, the order line means that the order includes multiple commodities, that is, the order information of each commodity forms an order line. For example, an order includes three order lines: commodity I, commodity II, and commodity III.

Step S305: saving ungrouped orders with a distance between the latest out-of-warehouse time and the current time being greater than the preset time difference threshold, and returning to step S301.

In the embodiment, the ungrouped orders, with a distance between the latest out-of-warehouse time and the current time being greater than the preset time difference threshold, can be saved, and after acquiring a new order, return to step S301, i.e., the process of grouping with the new order.

Alternatively, return to step S301 without waiting to acquire a new order. That is, the ungrouped orders, with a distance between the latest out-of-warehouse time and the current time being greater than the preset time difference threshold, may become orders with a distance between the latest out-of-warehouse time and the current time being less than or equal to the preset time difference threshold.

Step S306: pre-grouping orders with a distance between the latest out-of-warehouse time and the current time being less than or equal to the preset time difference threshold according to a business type.

In the embodiment, orders of different business types can be pre-grouped together, mainly by virtue of their destinations being the same after the completion of goods-picking in the warehouse. That is, although the business types are different, the warehouse destinations to be reached after the completion of goods-picking are the same. For example, orders of an internal-distribution business type and orders of a return business type can be pre-grouped together. Herein, the internal-distribution orders refer to goods relocation orders, and the return orders refer to orders for returning goods to suppliers.

Step S307: calculating the overlapping degree of the orders in the pre-grouped group, and grouping the orders whose overlapping degree is greater than a preset overlapping degree threshold together.

Preferably, orders may include one commodity or multiple commodities. If the orders include only one commodity, the overlapping degree can be calculated based on commodity attribute values. Preferably, the overlapping degree of commodity picking storage sites can be calculated. If the orders include multiple commodities, it can be calculated based on the overlapping degree of order lines between the orders. Preferably, the overlapping degree of commodity category attributes in order lines between the orders can be calculated. Herein, the order line means that the order includes multiple commodities, that is, the order information of each commodity forms an order line. For example, an order includes three order lines: commodity I, commodity II, and commodity III.

Step S308: grouping ungrouped orders with a distance between the latest out-of-warehouse time and the current time being less than or equal to the preset time difference threshold together.

Step S202: calculating the overlapping degree of passages where goods-picking storage sites between the goods-picking tasks are located.

In the embodiment, the goods-picking task includes orders, which can determine goods-picking storage site for different commodities, and then determine passages.

Step S203: associating goods-picking tasks, the overlapping degree of which is greater than a preset passage overlapping degree threshold, with the same transport vehicle.

Preferably, all the IDs of the goods-picking tasks, with an overlapping degree greater than the preset passage overlapping degree threshold, can be associated with the ID of a transport vehicle.

Step S204: assigning a transport vehicle to the goods-picking tasks associated with the same transport vehicle according to an out-of-warehouse priority.

In the embodiment, the out-of-warehouse priority means that the smaller the time difference between the latest out-of-warehouse time of orders in goods-picking tasks on the transport vehicle and the current time is, the higher the priority of the goods-picking tasks associated with the same transport vehicle is, i.e., first assigning a transport vehicle to the goods-picking tasks associated with the same transport vehicle.

Step S205: acquiring all goods-picking storage sites of the goods-picking tasks to which the transport vehicle has been assigned, as well as a location of the current transport vehicle and a destination location.

In the embodiment, the destination location of the transport vehicle is determined according to the business types of the orders in the goods-picking tasks to which the transport vehicle is assigned. Generally, the designated destination locations of the warehouse to be reached, after the completion of goods-picking in the warehouse as pointed to by the business types of the orders in the goods-picking tasks that can be associated with the same transport vehicle, are the same, for the convenience of subsequent work.

Step S206: acquiring a current warehouse traffic map, and calculating a path for the transport vehicle.

In the embodiment, the current warehouse traffic map can be used to avoid congested locations, and calculate the least time-consuming path of the transport vehicle passing through all goods-picking storage sites from the current location to the destination location.

Step S207: making the transport vehicle arrive at a corresponding goods-picking parking spot according to its path, and receiving the goods-picking parking spot where the transport vehicle is currently located.

In the embodiment, the goods-picking parking spot may correspond to multiple goods-picking storage sites. Further, goods-picking parking spots can be set on passages according to the quantity of goods-picking storage sites that can be completed by the goods-picking persons. Herein, if the passage is a two-way channel, the goods-picking parking spots are on a lane in the direction of travel of the transport vehicle. Furthermore, a center of an area including the goods-picking storage sites that can be completed by the goods-picking persons can be calculated, and the center is on the passage as a goods-picking parking spot.

Step S208: receiving location information of available goods-picking persons.

Preferably, under normal circumstances, the location of a goods-picking person is in front of a goods-picking storage site. That is, when the goods-picking person arrives at a goods-picking storage site and completes the goods-picking, he/she will upload the current location (at this time, the goods-picking person is available) and then request to perform goods-picking.

Step S209: judging whether there is a transport vehicle with a goods-picking task approaching an out-of-warehouse time limit, and if so, proceeding to step S210 and step S211, otherwise proceeding to step S212 and step S213.

In the embodiment, the goods-picking task approaching the out-of-warehouse time limit means that the goods-picking task includes orders whose time difference between the out-of-warehouse time and the current time is less than or equal to a minimum time difference threshold.

Step S210: associating the transport vehicle of the goods-picking task approaching the out-of-warehouse time limit with an available goods-picking person, and sending goods-picking task line information approaching the out-of-warehouse time limit to the available goods-picking person for execution.

Preferably, the ID in the sent goods-picking task line information approaching the out-of-warehouse time limit is associated with the ID of the available goods-picking person. In the embodiment, the goods-picking person holds a mobile terminal equipment that can receive goods-picking task line information.

Note that, at the time of executing step S210, a distance between available goods-picking persons and the transport vehicle of the goods-picking task approaching the out-of-warehouse time limit can be first judged. If the distance is greater than a preset maximum distance, there is a need to send the goods-picking task line information approaching the out-of-warehouse time limit to a goods-picking person closest to the current location of the transport vehicle of the goods-picking task approaching the out-of-warehouse time limit. That is, the goods-picking person, who is closest to the current location of the transport vehicle of the goods-picking task approaching the out-of-warehouse time limit, suspends the goods-picking task, and accepts the goods-picking task line information approaching the out-of-warehouse time limit.

Certainly, if the distance is less than or equal to the preset maximum distance, the transport vehicle of the goods-picking task approaching the out-of-warehouse time limit is associated with an available goods-picking person to send goods-picking task line information approaching the out-of-warehouse time limit.

Step S211: sending goods-picking task line information that matches a storage site of the goods-picking task approaching the out-of-warehouse time limit to an available goods-picking person, and executing step S214.

In the embodiment, the goods-picking task line matching a location of the goods-picking task approaching the out-of-warehouse time limit means that the storage site of the goods-picking task line on the transport vehicle is in an area where the storage site of the goods-picking task approaching the out-of-warehouse time limit is located. Herein, the area can be preset according to actual needs and warehouse conditions. For example, a passage, where the storage site of the goods-picking task approaching the out-of-warehouse time limit is located, can be taken as the area.

Step S212: calculating an available goods-picking person closest to the location of the transport vehicle to associate the transport vehicle with the available goods-picking person.

In the embodiment, the location of an available goods-picking person, who is closest to the goods-picking parking spot of the transport vehicle, is calculated to associate the transport vehicle with the available goods-picking person.

Step S213: notifying the goods-picking person of a goods-picking task line matching the location of the goods-picking person, and executing step S214.

In the embodiment, the goods-picking task line matching the location of the goods-picking person means that the storage site of the goods-picking task line on the transport vehicle is in an area where the goods-picking person is located. Herein, the area can be preset according to actual needs and warehouse conditions. For example, a passage, where the goods-picking person is located, can be taken as the area.

Step S214: determining that the execution of the goods-picking task line assigned to the available goods-picking person on the transport vehicle is completed.

In the embodiment, the transport vehicle and the goods-picking person execute the assigned goods-picking task line together. That is, the transport vehicle and the goods-picking person arrive at a corresponding storage site of the goods-picking task line together to pick goods.

Whenever a goods-picking task line is completed, the available goods-picking person can submit it via a touch screen on the transport vehicle or via an RF. Herein, the RF, which is an abbreviation of radio frequency, indicates an electromagnetic frequency that can be radiated into space, with a frequency range from 300 khz to 30 ghz.

Step S215: disassociating the transport vehicle from the available goods-picking person, judging whether the transport vehicle has next goods-picking parking spot according to its path, and if so, returning to step S207, otherwise the transport vehicle will reach a destination location according to its path and exit the process.

Figure 4:
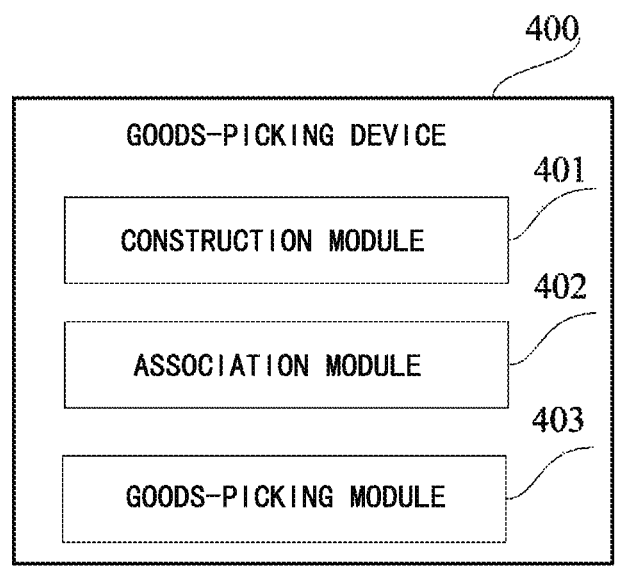
FIG. 4 is a schematic diagram of main modules of a goods-picking device according to an embodiment of the present invention.

FIG. 4 is a goods-picking device according to an embodiment of the present invention. As shown in FIG. 4, the goods-picking device 400 comprises a construction module 401, an association module 402 and a goods-picking module 403. The construction module 401 acquires order information to construct a goods-picking task. The association module 402 associates one or more goods-picking tasks with the same transport vehicle according to an overlapping degree of passages where goods-picking storage sites between the goods-picking tasks are located. Later, the goods-picking module 403 acquires all goods-picking storage sites of the goods-picking tasks of the transport vehicle, and then calculates a path for the transport vehicle, wherein the path comprises at least one goods-picking parking spot, each of which corresponds to at least one goods-picking storage site; and receives location information of available goods-picking persons and a goods-picking parking spot where the transport vehicle is currently located, calculates an available goods-picking person matching the transport vehicle, and sends a goods-picking task associated with the transport vehicle to the available goods-picking person for execution.

In a preferred embodiment, the construction module 401 can acquire order information through the following process to construct a goods-picking task:

The latest out-of-warehouse time is extracted from the order information to judge whether a distance between the latest out-of-warehouse time of orders and the current time is greater than a preset time difference threshold. Later, according to judgment results, if the distance is greater than the preset time difference threshold, orders with a distance between the latest out-of-warehouse time and the current time being greater than the preset time difference threshold are pre-grouped according to a business type, the orders are then grouped according to the overlapping degree, and ungrouped orders are saved for subsequent grouping. Certainly, if the distance is less than or equal to the preset time difference threshold, orders with a distance between the latest out-of-warehouse time and the current time being less than or equal to the preset time difference threshold are pre-grouped according to a business type, the orders are then grouped according to the overlapping degree, and ungrouped orders are then divided into one group.

As a reference embodiment, after receiving location information of available goods-picking persons, the goods-picking module 403 can judge whether there is a transport vehicle with a goods-picking task approaching an out-of-warehouse time limit. According to judgment results, if so, the goods-picking module 403 sends goods-picking task line information approaching the out-of-warehouse time limit and goods-picking task line information that matches a storage site of the goods-picking task approaching the out-of-warehouse time limit for execution. If not, the goods-picking module 403 calculates an available goods-picking person closest to the location of the transport vehicle, and sends the goods-picking task line information associated with the transport vehicle and matching the goods-picking storage site to the available goods-picking person for execution.

Note that, the goods-picking module 403 calculates a transport vehicle matching the available goods-picking persons, including: calculating an available goods-picking person closest to the location of the transport vehicle according to the goods-picking parking spot where the transport vehicle is currently located and the location information of the available goods-picking person.

Further, after the goods-picking module 403 sends a goods-picking task associated with the transport vehicle to the available goods-picking person for execution, there are comprised: determining execution and completion of the goods-picking task associated with the transport vehicle, and judging whether the transport vehicle has next goods-picking parking spot according to its path; if so, controlling the transport vehicle to drive to the next goods-picking parking spot; and if not, controlling the transport vehicle to drive to a destination location.

Note that: the goods-picking method and the goods-picking device of the present invention have a correspondence relationship in the specific implementation, so the repeated contents are no longer described.

Figure 5:
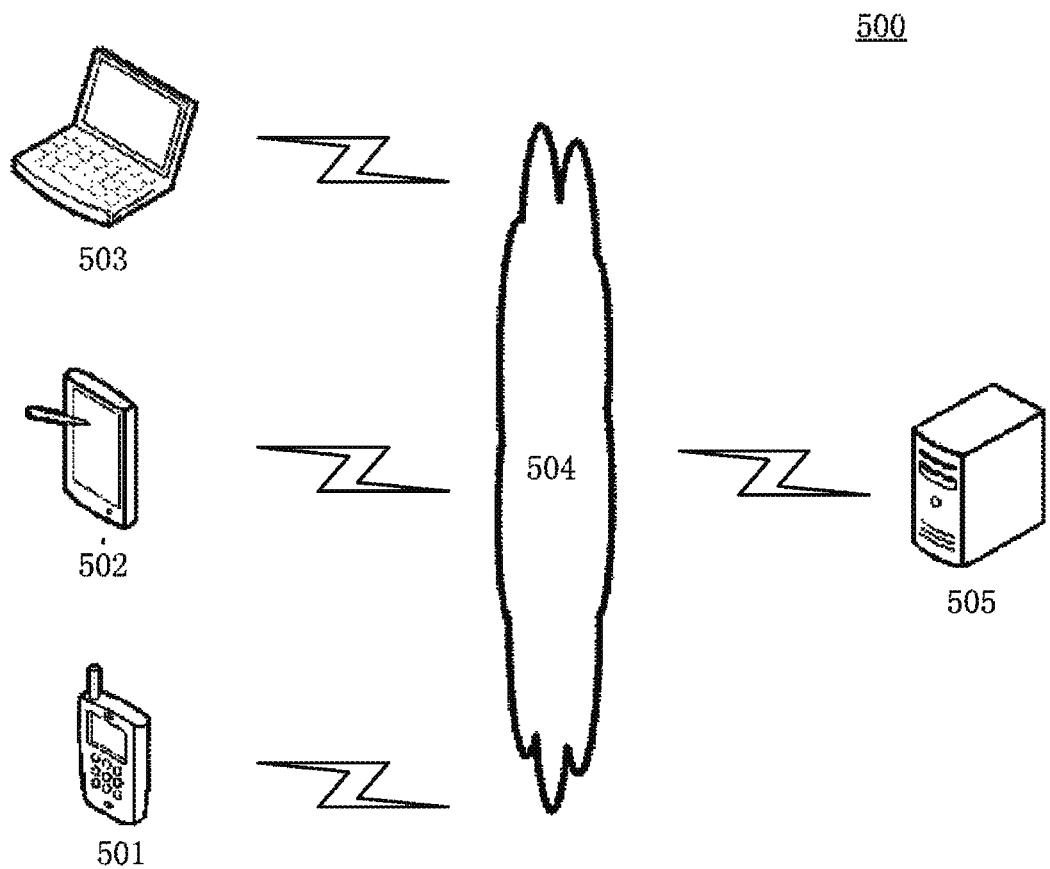
FIG. 5 is an exemplary system architecture diagram to which the embodiments of the present invention can be applied.

FIG. 5 shows an exemplary system architecture 500 of the goods-picking method or the goods-picking device to which the embodiments of the present invention can be applied.

As shown in FIG. 5, the system architecture 500 may include terminal devices 501, 502, 503, a network 504, and a server 505. The network 504 is used to provide a medium for communication links between the terminal devices 501, 502, 503 and the server 505. The network 504 may include various connection types, such as wired and wireless communication links, fiber optic cables, and so on.

The user can use the terminal devices 501, 502, 503 to interact with the server 505 via the network 504 to receive or send messages, etc. Various communication client applications, such as shopping applications, web browser applications, search applications, instant messaging tools, email clients, and social platform software (which are only examples), may be installed on the terminal devices 501, 502, 503.

The terminal devices 501, 502, 503 may be various electronic devices that have a display screen and support web browsing, including but not limited to smart phones, tablet computers, laptop computers, desktop computers, and so on.

The server 505 may be a server that provides various services, for example, a back-end management server (which is just an example) that provides support for shopping websites browsed by users using the terminal devices 501, 502, 503. The back-end management server can subject the received data such as a product information query request to processing such as analysis, and feed back the processing results (such as target push information and product information, which are only examples) to the terminal devices.

Note that: the goods-picking method provided by the embodiment of the present invention is generally executed by the server 505, and accordingly, the goods-picking device is generally provided in the server 505.

It should be understood that the numbers of the terminal device, the network and the server in FIG. 5 are merely illustrative. According to implementation needs, there may be any numbers of the terminal device, the network and the server.

Figure 6:
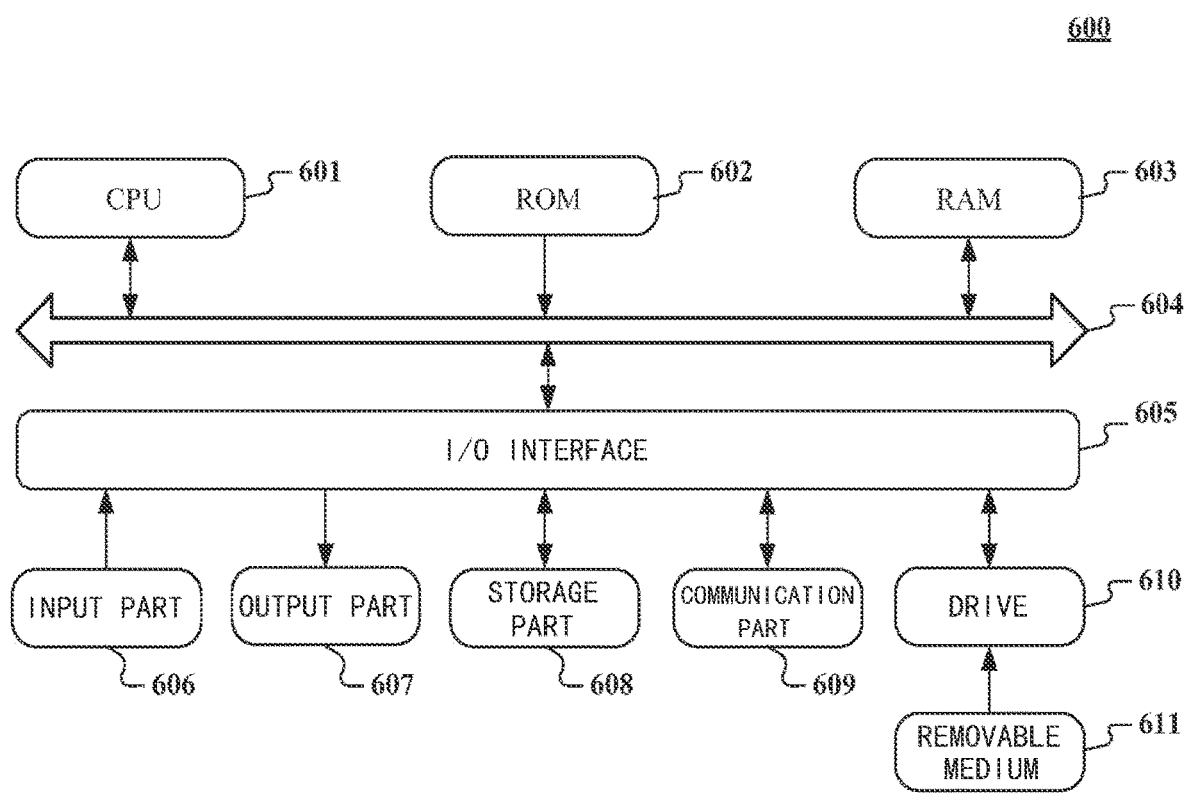
FIG. 6 is a structural schematic diagram of a computer system suitable for implementing a terminal device or a server according to an embodiment of the present invention.

Reference is now made to FIG. 6, which shows a structural schematic diagram of a computer system 600 suitable for implementing a terminal device according to an embodiment of the present invention. The terminal device shown in FIG. 6, which is only an example, should not bring any limitation to the function and use scope of the embodiment of the present invention.

As shown in FIG. 6, the computer system 600 includes a central processing unit (CPU) 601, which can perform various appropriate actions and processes according to a program stored in a read-only memory (ROM) 602 or a program loaded from a storage part 1008 into a random access memory (RAM) 603. Various programs and data required for the operation of the system 600 are also stored in the RAM 603. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard, a mouse and the like; an output part 607 including a cathode ray tube (CRT), a liquid crystal display (LCD), a speaker and the like; a storage part 608 including a hard disk and the like; and a communication part 609 including a network interface card such as a LAN card, a modem and the like. The communication part 609 performs communication processing via a network such as the Internet. A drive 610 is also connected to the I/O interface 605 as required. A removable medium 611, such as a magnetic disk, an optical disk, a magneto-optical disk, a semiconductor memory or the like, is installed on the drive 610 as required, so that the computer program read from it is installed into the storage part 608 as required.

In particular, according to the embodiment disclosed in the present invention, the process described above with reference to the flowchart can be implemented as a computer software program. For example, the embodiment disclosed in the present invention includes a computer program product, which includes a computer program carried on a computer-readable medium, and the computer program contains a program code for executing the method shown in the flowchart. In such an embodiment, the computer program may be downloaded and installed from the network through the communication part 609, and/or installed from the removable medium 611. When the computer program is executed by the central processing unit (CPU) 601, the above-mentioned functions defined in the system of the present invention are executed.

Note that: the computer-readable medium shown in the present invention may be a computer-readable signal medium or a computer-readable storage medium, or any combination of the above two. The computer-readable storage medium may be, for example, but not limited to, an electrical, magnetic, optical, electromagnetic, infrared or semiconductor system, device or device, or a combination of any of the above. More specific examples of the computer-readable storage medium may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present invention, the computer-readable storage medium may be any tangible medium that contains or stores a program, and the program may be used by or in combination with an instruction execution system, apparatus or device. Moreover, in the present invention, the computer-readable signal medium may include a data signal propagated in baseband or as a part of a carrier wave, in which a computer-readable program code is carried. The propagated data signal can take many forms, including but not limited to an electromagnetic signal, an optical signal, or any suitable combination of the above. The computer-readable signal medium may also be any computer-readable medium other than the computer-readable storage medium, and the computer-readable medium can send, propagate, or transmit a program used by or in combination with an instruction execution system, apparatus or device. The program code contained on the computer-readable medium can be transmitted by any suitable medium, including but not limited to: wireless, wire, optical cable, RF and the like, or any suitable combination of the above.

The flowcharts and block diagrams in the drawings illustrate possible system architectures, functions and operations of the system, method and computer program product according to various embodiments of the present invention. In this regard, each block in the flowcharts or block diagrams can represent a module, a program segment or a part of a code, which contains one or more executable instructions for realizing the specified logic function. It should also be noted that, in some alternative implementations, the functions marked in the blocks may also occur in a different order from that marked in the drawings. For example, two blocks shown in succession can actually be executed substantially in parallel, and they can sometimes be executed in a reverse order, depending on the functions involved. It should further be noted that each block in the block diagrams or flowcharts, and the combination of blocks in the block diagrams or flowcharts can be implemented by a dedicated hardware-based system that performs the specified functions or operations, or can be implemented by a combination of dedicated hardware and computer instructions.

The modules involved in the embodiments described in the present invention can be implemented by software or hardware. The described modules can also be provided in a processor, which, for example, can be described as: a processor including a construction module, an association module, and a goods-picking module. Herein, the names of these modules do not constitute limitations to the modules themselves under certain circumstances.

As another aspect, the present invention also provides a computer-readable medium, which may be included in the device described in the above embodiment or may exist alone without being assembled into the device. The above computer-readable medium carries one or more programs that, when executed by a device, cause the device to include: acquiring order information to construct a goods-picking task; associating one or more goods-picking tasks with the same transport vehicle according to an overlapping degree of passages where goods-picking storage sites between the goods-picking tasks are located; acquiring all goods-picking storage sites of the goods-picking tasks of the transport vehicle, and then calculating a path for the transport vehicle, wherein the path comprises at least one goods-picking parking spot, each of which corresponds to at least one goods-picking storage site; and receiving location information of available goods-picking persons and a goods-picking parking spot where the transport vehicle is currently located, calculating an available goods-picking person matching the transport vehicle, and sending a goods-picking task associated with the transport vehicle to the available goods-picking person for execution.

The technical solutions according to the embodiments of the present invention can solve the problem of low goods-picking work efficiency in the prior art.

The above specific embodiments do not constitute limitations to the scope of protection of the present invention. Those skilled in the art should understand that, depending on design requirements and other factors, various modifications, combinations, sub-combinations and replacements may occur. Any modifications, equivalent substitutions, improvements and the like made within the spirit and principle of the present invention shall be included in the scope of protection of the present invention.

The invention claimed is:

1. A goods-picking method, comprising:
   acquiring, by one or more processors, order information to construct a goods-picking task;
   associating, by the one or more processors, one or more goods-picking tasks with the same transport vehicle according to an overlapping degree of passages where goods-picking storage sites between the goods-picking tasks are located;
   acquiring, by the one or more processors, all goods-picking storage sites of the goods-picking tasks of the transport vehicle, and then calculating a path for the transport vehicle, wherein the path comprises at least one goods-picking parking spot, each of which corresponds to at least one goods-picking storage site;
   receiving, by the one or more processors, location information of available goods-picking persons and a goods-picking parking spot where the transport vehicle is currently located, calculating an available goods-picking person matching the transport vehicle, and sending a goods-picking task associated with the transport vehicle to the available goods-picking person for execution; and
   after sending a goods-picking task associated with the transport vehicle to the available goods-picking person for execution:
      determining execution and completion of the goods-picking task associated with the transport vehicle, and
      judging whether the transport vehicle has next goods-picking parking spot according to its path,
         if so, controlling the transport vehicle to drive to the next goods-picking parking spot; and
      if not, controlling the transport vehicle to drive to a destination location,
   wherein calculating an available goods-picking person matching the transport vehicle comprises:
      calculating an available goods-picking person closest to the location of the transport vehicle according to the goods-picking parking spot where the transport vehicle is currently located and the location information of the available goods-picking person, so that the available goods-picking person picks goods to the transport vehicle.

2. The method according to claim 1, wherein acquiring order information to construct a goods-picking task comprises:
   extracting the latest out-of-warehouse time in the order information, and judging whether a distance between the latest out-of-warehouse time of orders and current time is greater than a preset time difference threshold; and
   according to judgment results, if the distance is greater than the preset time difference threshold, pre-grouping orders with the distance between the latest out-of-warehouse time and the current time being greater than the preset time difference threshold according to a business type, then grouping the orders according to the overlapping degree, and saving ungrouped orders for subsequent grouping; if the distance is less than or equal to the preset time difference threshold, pre-grouping orders with the distance between the latest out-of-warehouse time and the current time being less than or equal to the preset time difference threshold according to a business type, then grouping the orders according to the overlapping degree, and then dividing ungrouped orders into one group.

3. The method according to claim 1, further comprising, after receiving location information of available goods-picking persons:
   judging whether there is a transport vehicle with a goods-picking task approaching an out-of-warehouse time limit,
   if so, sending goods-picking task line information approaching the out-of-warehouse time limit and goods-picking task line information that matches a storage site of the goods-picking task approaching the out-of-warehouse time limit for execution; and
   if not, calculating an available goods-picking person closest to the location of the transport vehicle, and sending the goods-picking task line information associated with the transport vehicle and matching the goods-picking storage site to the available goods-picking person for execution.

4. An electronic device, comprising:
   one or more processors; and
   a storage device for storing one or more programs, wherein when executed by the one or more processors, the one or more programs cause the one or more processors to implement a method comprising:
      acquiring order information to construct a goods-picking task;
      associating one or more goods-picking tasks with the same transport vehicle according to an overlapping degree of passages where goods-picking storage sites between the goods-picking tasks are located;
      acquiring all goods-picking storage sites of the goods-picking tasks of the transport vehicle, and then calculating a path for the transport vehicle, wherein the path comprises at least one goods-picking parking spot, each of which corresponds to at least one goods-picking storage site;
      receiving location information of available goods-picking persons and a goods-picking parking spot where the transport vehicle is currently located, calculating an available goods-picking person matching the transport vehicle, and sending a goods-picking task associated with the transport vehicle to the available goods-picking person for execution; and
      after sending a goods-picking task associated with the transport vehicle to the available goods-picking person for execution:
         determining execution and completion of the goods-picking task associated with the transport vehicle, and
         judging whether the transport vehicle has next goods-picking parking spot according to its path,
            if so, controlling the transport vehicle to drive to the next goods-picking parking spot; and
            if not, controlling the transport vehicle to drive to a destination location,
      wherein calculating an available goods-picking person matching the transport vehicle comprises:
      calculating an available goods-picking person closest to the location of the transport vehicle according to the goods-picking parking spot where the transport vehicle is currently located and the location information of the available goods-picking person, so that the available goods-picking person picks goods to the transport vehicle.

5. The electronic device according to claim 4, wherein acquiring order information to construct a goods-picking task comprises:
- extracting the latest out-of-warehouse time in the order information, and judging whether a distance between the latest out-of-warehouse time of orders and current time is greater than a preset time difference threshold; and
- according to judgment results, if the distance is greater than the preset time difference threshold, pre-grouping orders with a distance between the latest out-of-warehouse time and current time being greater than the preset time difference threshold according to a business type, then grouping the orders according to the overlapping degree, and saving ungrouped orders for subsequent grouping; if the distance is less than or equal to the preset time difference threshold, pre-grouping orders with a distance between the latest out-of-warehouse time and the current time being less than or equal to the preset time difference threshold according to a business type, then grouping the orders according to the overlapping degree, and then dividing ungrouped orders into one group.

6. The electronic device according to claim 4, wherein the method further comprises:
- after receiving location information of available goods-picking persons:
- judging whether there is a transport vehicle with a goods-picking task approaching an out-of-warehouse time limit,
- if so, sending goods-picking task line information approaching the out-of-warehouse time limit and goods-picking task line information that matches a storage site of the goods-picking task approaching the out-of-warehouse time limit for execution; and
- if not, calculating an available goods-picking person closest to the location of the transport vehicle, and sending the goods-picking task line information associated with the transport vehicle and matching the goods-picking storage site to the available goods-picking person for execution.

7. A non-transitory computer-readable medium on which a computer program is stored, characterized in that, when executed by a processor, the program implements a method comprising:
- acquiring order information to construct a goods-picking task;
- associating one or more goods-picking tasks with the same transport vehicle according to an overlapping degree of passages where goods-picking storage sites between the goods-picking tasks are located;
- acquiring all goods-picking storage sites of the goods-picking tasks of the transport vehicle, and then calculating a path for the transport vehicle, wherein the path comprises at least one goods-picking parking spot, each of which corresponds to at least one goods-picking storage site;
- receiving location information of available goods-picking persons and a goods-picking parking spot where the transport vehicle is currently located, calculating an available goods-picking person matching the transport vehicle, and sending a goods-picking task associated with the transport vehicle to the available goods-picking person for execution; and
- after sending a goods-picking task associated with the transport vehicle to the available goods-picking person for execution:
  - determining execution and completion of the goods-picking task associated with the transport vehicle, and
- judging whether the transport vehicle has next goods-picking parking spot according to its path,
- if so, controlling the transport vehicle to drive to the next goods-picking parking spot; and
- if not, controlling the transport vehicle to drive to a destination location,
- wherein calculating an available goods-picking person matching the transport vehicle comprises:
  - calculating an available goods-picking person closest to the location of the transport vehicle according to the goods-picking parking spot where the transport vehicle is currently located and the location information of the available goods-picking person, so that the available goods-picking person picks goods to the transport vehicle.

8. The non-transitory computer-readable medium according to claim 7, wherein acquiring order information to construct a goods-picking task comprises:
- extracting the latest out-of-warehouse time in the order information, and judging whether a distance between the latest out-of-warehouse time of orders and current time is greater than a preset time difference threshold; and
- according to judgment results, if the distance is greater than the preset time difference threshold, pre-grouping orders with a distance between the latest out-of-warehouse time and the current time being greater than the preset time difference threshold according to a business type, then grouping the orders according to the overlapping degree, and saving ungrouped orders for subsequent grouping; if the distance is less than or equal to the preset time difference threshold, pre-grouping orders with a distance between the latest out-of-warehouse time and the current time being less than or equal to the preset time difference threshold according to a business type, then grouping the orders according to the overlapping degree, and then dividing ungrouped orders into one group.

9. The non-transitory computer-readable medium according to claim 7, wherein the method further comprises:
- after receiving location information of available goods-picking persons:
- judging whether there is a transport vehicle with a goods-picking task approaching an out-of-warehouse time limit,
- if so, sending goods-picking task line information approaching the out-of-warehouse time limit and goods-picking task line information that matches a storage site of the goods-picking task approaching the out-of-warehouse time limit for execution; and
- if not, calculating an available goods-picking person closest to the location of the transport vehicle, and sending the goods-picking task line information associated with the transport vehicle and matching the goods-picking storage site to the available goods-picking person for execution.

* * * * *